United States Patent
Otsubo (10) Patent No.: US 12,267,480 B2
(45) Date of Patent: Apr. 1, 2025

(54) STEREO IMAGING DEVICE WITH IMAGE DISTORTION CORRECTION

(71) Applicant: MAXELL, LTD., Kyoto (JP)

(72) Inventor: Hiroyasu Otsubo, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/055,333

(22) PCT Filed: Apr. 23, 2019

(86) PCT No.: PCT/JP2019/017298
§ 371 (c)(1),
(2) Date: Nov. 13, 2020

(87) PCT Pub. No.: WO2020/012756
PCT Pub. Date: Jan. 16, 2020

(65) Prior Publication Data
US 2021/0110188 A1    Apr. 15, 2021

(30) Foreign Application Priority Data

Jul. 13, 2018 (JP) .................. 2018-133680

(51) Int. Cl.
*H04N 13/106* (2018.01)
*G06T 5/80* (2024.01)
(Continued)

(52) U.S. Cl.
CPC ............ *H04N 13/239* (2018.05); *G06T 5/80* (2024.01); *G06V 10/255* (2022.01); *G06V 20/58* (2022.01);
(Continued)

(58) Field of Classification Search
CPC .............. G06K 9/03; G06K 9/32; G06K 9/54; G06K 2209/21; G06K 9/00805; G06K 9/3241;
(Continued)

(56) References Cited

U.S. PATENT DOCUMENTS

2006/0188172 A1 * 8/2006 Higurashi ............ H04N 5/3572
382/275
2007/0126868 A1 * 6/2007 Kiyohara ................ G06T 7/246
348/143
(Continued)

FOREIGN PATENT DOCUMENTS

JP     2007158829 A * 6/2007 ......... G06K 9/00255
JP     2012063350 A * 3/2012 ............... G06T 7/73
(Continued)

OTHER PUBLICATIONS

International Search Report of PCT/JP2019/017298 dated Jul. 16, 2019.
Chinese Office Action received in corresponding Chinese Application No. 201980030882.7 dated Jul. 5, 2021.

*Primary Examiner* — Dave Czekaj
*Assistant Examiner* — Berteau Joisil
(74) *Attorney, Agent, or Firm* — MATTINGLY & MALUR, PC (57) ABSTRACT

A stereo imaging device is capable of detecting a target with a high precision, while photographing a wide range. The stereo imaging device has an imaging unit 5 including a lens and an imaging sensor. The lens has a low distortion region and a high distortion region, the low distortion region being a portion having a distortion smaller than a predetermined amount, the high distortion region being a portion having a distortion larger than the low distortion region. A cutout unit outputs an image from which a range including a detection target has been cut out from an area photographed through the low distortion region, such output being performed for image photographed by a pair of imaging units when a detection target is present within an area photographed through the low distortion region. A detection unit detects a detection target based on the cutout image.

21 Claims, 5 Drawing Sheets

(51) Int. Cl.
  *G06V 10/20* (2022.01)
  *G06V 20/58* (2022.01)
  *H04N 13/239* (2018.01)
  *H04N 23/698* (2023.01)
  *H04N 13/00* (2018.01)

(52) U.S. Cl.
  CPC ......... *H04N 13/106* (2018.05); *H04N 23/698* (2023.01); *G06T 2207/10012* (2013.01); *G06V 2201/07* (2022.01); *H04N 2013/0092* (2013.01)

(58) Field of Classification Search
  CPC .......... G06T 5/006; G06T 2207/10012; H04N 5/23238; H04N 13/106; H04N 13/239; H04N 2013/0092; H04N 2013/0081; H04N 13/139; H04N 5/225; H04N 5/23218; H04N 9/31; H04N 5/3572; G01B 11/02
  USPC ......................................................... 348/148
  See application file for complete search history.

(56) References Cited

U.S. PATENT DOCUMENTS

| | | | |
|---|---|---|---|
| 2009/0207266 A1* | 8/2009 | Yoda | H04N 5/2628 |
| | | | 348/222.1 |
| 2012/0045100 A1* | 2/2012 | Ishigami | G06T 7/55 |
| | | | 382/106 |
| 2012/0093365 A1 | 4/2012 | Aragane et al. | |
| 2013/0286255 A1* | 10/2013 | Suzuki | H04N 5/2259 |
| | | | 348/239 |
| 2014/0043444 A1* | 2/2014 | Haraguchi | H04N 13/296 |
| | | | 348/47 |
| 2018/0130197 A1* | 5/2018 | Weiss | G01B 11/022 |
| 2018/0205895 A1* | 7/2018 | Mitsunaga | H04N 25/41 |
| 2019/0066276 A1* | 2/2019 | Kawana | G06T 5/006 |
| 2019/0266423 A1* | 8/2019 | Akiba | G06T 5/006 |

FOREIGN PATENT DOCUMENTS

| | | | | |
|---|---|---|---|---|
| JP | 2013-109779 A | 6/2013 | | |
| WO | WO-2010032298 A1 * | 3/2010 | ......... | G06K 9/00228 |
| WO | 2017/010316 A1 | 1/2017 | | |

* cited by examiner

STEREO IMAGING DEVICE WITH IMAGE DISTORTION CORRECTION

TECHNICAL FIELD

The present invention relates to a stereo imaging device.

BACKGROUND ART

With the recent improvement in image recognition technology, it has become possible to avoid a danger while driving a car, perform an automatic driving, by performing an image recognition upon an in-vehicle camera image. It is also possible to detect a known criminal by performing an image recognition upon a surveillance camera image. In addition, a stereo camera system including a pair of cameras serving as in-vehicle cameras or surveillance cameras is used to detect distances extending from the stereo camera system to points on a subject corresponding to respective points on an image so as to perform an image recognition, based on a positional difference (parallax) between the corresponding points on respective images corresponding to the same target points on the subject (for example, Patent Document 1). In image recognition using a stereo camera, since image recognition can be performed using distance information, it is possible to easily and accurately identify an object (for example, a person, an animal, a vehicle, etc.).

CITATION LIST

Patent Document

Patent Document 1: JP 2013-109779A

SUMMERY OF THE INVENTION

Technical Problems

However, in-vehicle cameras and surveillance cameras are required to be able to detect an object while capturing a wide range. On the other hand, when a wide-angle lens is used to capture a wide range of image, an image will be compressed in its peripheral portion. That is, when a wide-angle lens is used, an image obtained will have a large distortion in the peripheral portion. Then, if a detection target is to be detected using an image with such a large distortion, there is a problem that a detection precision will become low.

When considering a detection precision, it is preferable to use a high resolution imaging sensor, but the number of pixels will be very large, especially when trying to shoot a wide area. Then, if an arithmetic process relating to detection is performed using an image with a large number of pixels, an amount of calculation will become enormous, and it takes a long time to process one frame when processing a moving image such as an image of an in-vehicle-camera or a surveillance camera. For this reason, there is a problem that due to an arithmetic processing speed of an integrated circuit that performs an arithmetic processing, an arithmetic processing time for one frame will become too long, and the processing may not be in time when a real-time response is required.

The present invention has been accomplished in view of the above-discussed circumstances, and it is an object of the present invention to provide a stereo imaging device capable of detecting a target with a high precision while photographing a wide range.

Solution to Problems

In order to achieve the above object, the stereo imaging device of the present invention comprising:

imaging unit including a lens and an imaging sensor, said lens having a low distortion region and a high distortion region, the low distortion region being a portion having a distortion smaller than a predetermined amount, the high distortion region being a portion having a distortion larger than the low distortion region;

cutout unit for outputting a cutout image from which a range including a detection target has been cut out from an area photographed through the low distortion region, such output being performed for image photographed by a pair of imaging units when a detection target is present within an area photographed through the low distortion region; and detection unit for detecting a detection target based on the cutout image.

According to such a configuration, the detection unit detects a detection target based on an image from which a range including a detection target has been cut out, such detection being performed in an area photographed through a low distortion region. Namely, the detection unit detects a detection target based on an image having a low distortion, thereby making it possible to detect a detection target with a high precision.

Further, since an image for which the detection unit is used is an image cut out by the cutout unit, its display range becomes narrower than an image photographed by the imaging unit. Therefore, it is possible to reduce a data amount of an image without unduly lowering a resolution. Namely, when trying to reduce the data amount of an image (when trying to reduce the number of pixels) without narrowing the display range, it is usual to decimate the pixles to compress the image, and thus causing a reduction in the resolution of the image. In the present invention, since only a necessary portion is cut out for detection, it is possible to reduce the data amount of an image without lowering a resolution due to such a cutout. Then, since the data amount of an image is reduced without unduly lowering the resolution due to such a cutout, it is possible to perform a detection with a high precision, while maintaining at a high speed a processing using the detection unit.

On the other hand, regarding an image which has been cut out, it is also possible to decimate the pixels before performing a detection using the detection unit, resulting in a decrease in the resolution of the image. Even at this time, since it is allowable to reduce the number of pixels to be decimated when compared to a situation in which pixels are decimated in an image before performing a cutout processing, it is possible to inhibit the resolution from being lowered.

As described above, according to the present invention, it is possible to perform an image pickup in a wide range through a high distortion region, while enabling a high precision detection by performing a detection using a low distortion region.

According to the configuration of the present invention, an amount of distortion in the low distortion region is 5% or lower.

According to the above configuration, it is possible to perform a detection using the detection unit, with a particularly high precision.

Further, in the above configuration of the present invention, it is preferable to include distortion correcting unit for removing an image distortion based on a distortion of lens, wherein the distortion correcting unit is capable of removing a distortion before the detection unit performs a detection based on an image cut out by the cutout unit.

According to such a configuration, a distortion of an image based on a distortion of a lens is removed from an image captured by the imaging unit and existing before or after a cutout processing based on the cutout unit, Therefore, the detection precision of the detection unit can be improved.

According to the above configuration of the present invention, the cutout unit is adapted not to cut out an image including a detection target, with respect to a detection target existing in an area photographed through the high distortion region.

According to such a configuration, for a detection target in a high distortion region, an image including a detection target is not cut out and a detection target based on a cutout image is not detected. Therefore, the processings based on the detection unit can be reduced, thereby making it possible to reduce a load on the detection unit. Further, since extra detection can be omitted, it is possible to increase the number of detections for a detection target in a low distortion region, thereby improving the detection precision.

Further, according to the above configuration of the present invention, The stereo imaging device further includes reduction unit for reducing a data amount of an image photographed by a pair of imaging units, wherein the detection unit, after performing a first detection for detecting a detection target based on a reduced image reduced by the reduction unit, performs a second detection for detecting a detection target based on a second cutout image cut out by the cutout unit, in a manner such that a display range becomes narrower than the reduced image, and corrects a result of the first detection using a result of the second detection.

According to such a configuration, since an image cut out by the cutout unit has a narrower display range than a reduced image, it is possible to obtain a high resolution image using an amount of data which is the same as a reduced image. For this reason, based on a reduced image having a relatively low resolution but a wide display range, after performing a rough detection and for a part of the range in which a rough detection has been performed, it is possible to perform a high precision detection using a high resolution image. Therefore, for example, regarding an entire range photographed by the imaging unit, after performing a detection which is rough but wide in its range, it is possible to perform a cutout processing and have a high precision detection for a detection target existing in a low distortion region. Further, since a rough detection result is corrected by using a high precision detection result, it is possible to obtain a detection result which is more correct or having a higher precision. Namely, it is possible to achieve a both a wide-range and high-precision detection.

Here, a correction of the detection result includes not only correcting a detection result, but also adding new information obtained by the second detection into the first detection result.

Further, according to the above configuration of the present invention, the detection unit, after performing the second detection, performs a third detection for detecting a detection target based on a third cutout image cut out by the cutout unit, in a manner such that its display range is at least partially different from the display range of the second cutout image, and corrects a result of previous detection using the result of the third detection.

According to such a configuration, since the second cutout image and the third cutout image are at least partially different from each other in their display ranges, the detection range of the second detection and the detection range of the third detection will become at least partially different from each other. Namely, when it is desired to detect a wide range with a high precision, such range will be divided into a second cutout image and a third cutout image, thereby making it possible to perform a high precision detection in a wide range by performing the respective detections. Further, since the result of the first detection or the result of the second detection is corrected by using the result of the third detection, it is possible to obtain a more correct or precise detection result.

Further, according to the above configuration of the present invention, the detection unit, after performing the second detection and within the display range of the second cutout image, performs a fourth detection for detecting a detection target based on a fourth cutout image cut out by the cutout unit, in a manner such that its display range becomes narrower than the second cutout image, and corrects a result of previous detection using the result of the fourth detection.

According to such a configuration, the fourth cutout image is within the display range of the second cutout image and has a narrower display range than the second cutout image. Namely, the display range is gradually narrowed from the reduced image towards the second cutout image and the fourth cutout image. Therefore, it is possible to gradually increase the detection precision for a required range while gradually narrowing the detection range. Consequently, it is possible to at first roughly recognize an entire detection target and then detect the feature points in more detail.

Effects of the Invention

Using the stereo imaging device of the present invention, it is possible to detect a detection target with a high precision, while photographing a wide range.

DESCRIPTION OF EMBODIMENTS

Hereinafter, an embodiment of the present invention will be described.

The stereo imaging device according to the present embodiment uses a stereo camera as a camera mainly for monitoring, such as a monitoring camera and an in-vehicle camera, detects an object and a distance to the object.

Figure 1:
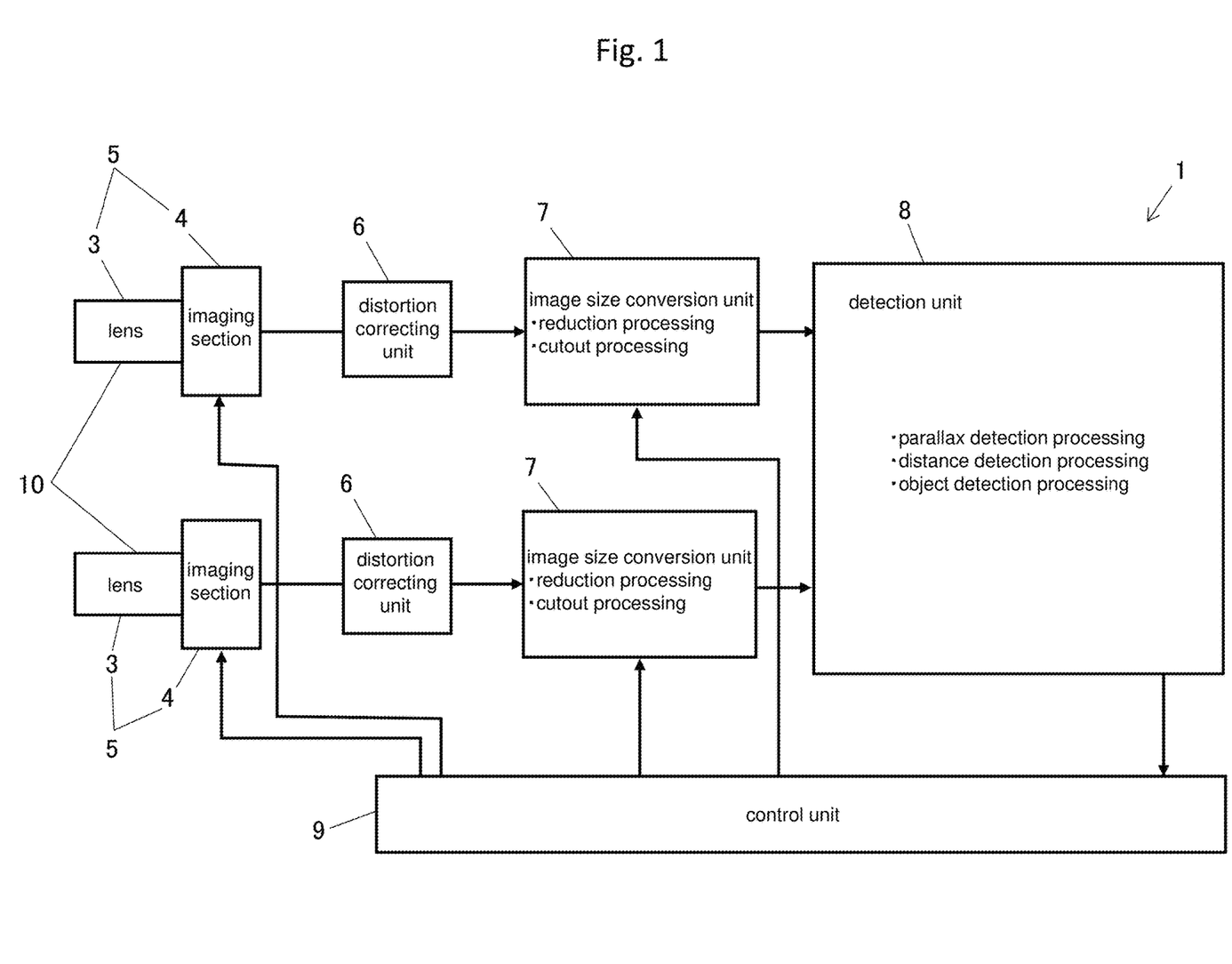
FIG. 1 is a block diagram showing a stereo imaging device according to an embodiment of the present invention.

As shown in FIG. 1, the stereo imaging device 1 of the present embodiment includes: a pair of imaging units 5 each having a lens 3 and an image pickup section 4; a pair of distortion correcting units 6 each for correcting a distortion based on a lens 3 and included in an image fed from the image pickup section 4 of an imaging unit 5; a pair of image size conversion units 7 each for converting the size of an image fed from each of the pair of distortion correcting units 6; a detection unit 8 for measuring a distance of an object included in an image and for recognizing the object, based on images fed from the pair of image size conversion units 7; and a control unit 9 for controlling the imaging unit 5 and the image size conversion unit 7.

On the other hand, it is also possible for the above-mentioned various units to be realized by using, for example, various electronic circuits (processors (CPU, DSP, etc.), IC, or information storage media such as ROM, RAM, etc.), or software composed of predetermined programs stored in ROM or the like. Further, the distortion correcting unit 6 and the image size conversion unit 7 may be provided only one each, and the pair of images outputted from the pair of imaging units 5 may be processed by only one circuit.

The pair of imaging units 5 constitute the stereo camera 10. Further, the imaging units 5, using the lenses 3, each outputs an image formed on an imaging sensor included in an imaging section 4, as an image (moving image data). Moreover, the pair of imaging units 5 output a pair of synchronized images. On the other hand, it is also possible for other units shown in FIG. 1 to be included in the stereo camera 10. In addition, it is further possible for some or all of these units to be realized by using one or more other units connected via various wirings or networks.

Figure 2:
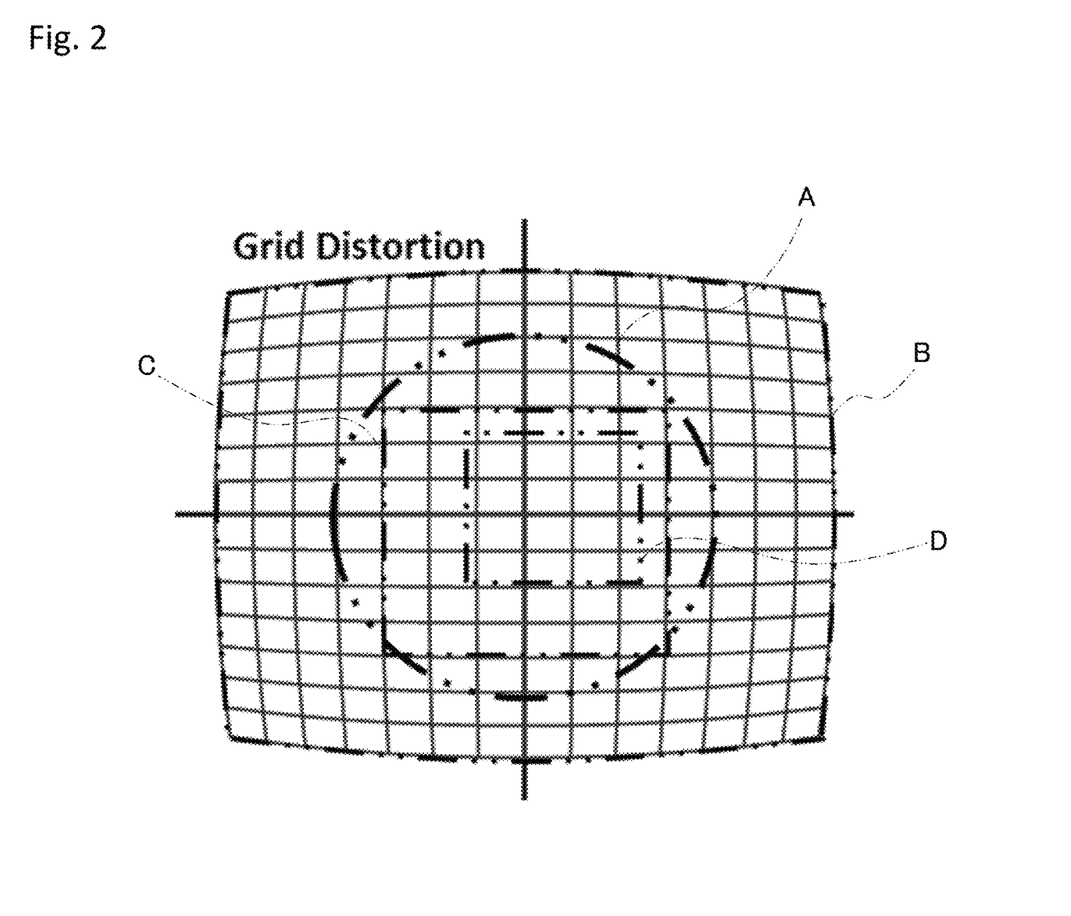
FIG. 2 is a diagram showing distortion characteristics of the lenses of the stereo imaging device.

Lens 3 is a bifocal wide-angle lens and has a so-called barrel-shaped distortion characteristic. The distortion characteristic of the lens 3 is shown in FIG. 2. As shown in FIG. 2, an image is compressed in the peripheral portion of the lens 3. Specifically, distortion is almost 0 inside the circle A indicated by the chain double-dashed line, and the distortion is large outside the circle A. Hereinafter, an area inside the circle A in which the distortion is substantially 0 is called a distortion zero area (low distortion region), and an area outside the circle A is called a viewing angle ensuring area (high distortion region). The outer periphery of the viewing ensuring area is a portion indicated by a square B. Further, in an image photographed by the imaging units 5, a portion photographed through the inside of the circle A (low distortion region) is also called a distortion zero area, and a portion photographed through the outside of the circle A (high distortion region) is also called a viewing angle ensuring area.

An amount of distortion (optical distortion) in the distortion zero area is 5% or less. Preferably, such an amount of distortion is 3% or less, more preferably 1% or less. Further, an amount of distortion in the viewing angle ensuring area is larger than an amount of distortion in the distortion zero area. That is, the distortion zero area is an area where distortion has been reduced in order to perform a distance detection and an object detection with a high precision, while a viewing angle ensuring area is an area for increasing a viewing angle (shooting range) where a detection range is to be enlarged.

Using the imaging unit 5, an image can be picked up by the lens 3 having the above-described characteristic. Therefore, the imaging unit 5 can output an image in which a peripheral portion has been distorted into a reduced state according to the distortion characteristic of the lens 3. Specifically, the imaging unit 5 can output an image in which a distortion of a central portion photographed through the distortion zero area of lens 3 is small, while a distortion of the peripheral portion photographed through the viewing angle ensuring area is large.

An output image from the imaging unit 5 is fed into the distortion correcting unit 6. The distortion correcting unit 6 performs a process of removing a distortion caused by lens 3 and included in the output image from the imaging unit 5. Here, the distortion can be removed by a known method, for example, using a known electronic circuit for image conversion for distortion removal. Moreover, the distortion removal may be performed at another position. For example, the distortion removal may be effected after the image size is converted by image size conversion unit 7. In addition, for example, when the imaging unit 5 perform a cutout processing (to be described later), the distortion may be removed from the cutout image.

On the other hand, distortion removal does not have to be carried out so completely, and it is allowed to be finished if the distortion has been reduced as compared to an original image.

Next, an image from which a distortion has been removed by a distortion correcting unit 6 is fed into an image size conversion unit 7. The image size conversion unit 7 performs a processing for converting the size of the image into a size that can be processed in the detection unit 8. In the stereo imaging device 1 of the present embodiment, the maximum image size that can be processed in the detection unit 8 is VGA (640 pixels×480 pixels. Hereinafter, "pixels" will be omitted and the indication will be made to be 640×480.). The image size conversion unit 7 performs a processing for reducing the size of the image so that the image size becomes VGA or less. In other words, the image size conversion unit 7 performs a processing for reducing the amount of image data. Specifically, the image size conversion unit 7 performs an image reduction processing and an image cutout processing.

In the image reduction processing, the number of pixels is reduced such that the image area is reduced. Specifically, for example, when the number of pixels of the imaging sensor is 3200×2400, the size in the horizontal direction and the size in the vertical direction are decimated to ⅕ that is 640×480. As a result, the image is reduced without changing the display range of the image. Namely, the reduction processing is a process of reducing the image size without changing the display range of the image (while keeping the range surrounded by the square B shown in FIGS. 2, 5). An image reduced by the reduction processing while maintaining the display range of the image is called a reduced image.

Also, in the image cutout processing, the image size is reduced by cutting out an image rather than reducing it. Specifically, the cutout is to capture a partial range of the image of the entire screen photographed by the imaging unit 5 (for example, ranges surrounded by squares C, D shown in FIG. 2 or ranges surrounded by squares E, F shown in FIG. 5). For example, among 3200×2400 images, the cutout is to capture a range of 1200×1200 of the central portion included in the distortion zero area. Further, the reduction processing is performed upon the captured 1200×1200 image to form an image of 640×480. Moreover, when the image cut out by the cutout processing is 640×480 or smaller, the image may be fed to the subsequent stage (detection unit 8) without performing the reduction processing. In this way, the cutout processing is a process of reducing the image size by cutting out a part of the display range of an original image. As a result, the display range of the image becomes small and the analysis range also becomes small, but the resolution becomes as high as before the cutout processing, thus making it possible to increase the detection precision of the detection unit 8. Here, an image cut out by the cutout processing is called a cutout image.

On the other hand, a position at which the cutout is to be performed is arbitrary. For example, it is possible to cut out a characteristic portion of an image that has already been image-recognized and existing one or more frames earlier. For example, it is possible to cut out a range including a detection target such as a person.

As described above, each image size conversion unit 7 has a function as a reduction unit for performing an image reduction processing and a function as a cutout unit for performing an image cutout processing. However, the image reduction processing and the cutout processing may be performed by, for example, the imaging unit 5, Namely, for example, an imaging sensor has been known that can perform a decimation on an image, it is also possible to perform a reduction processing on an image by using such an imaging sensor. Further, when detection is performed on a cutout image, an imaging unit 5 may be used as cutout unit for outputting an image which has cut out a portion that performs such a detection.

Next, an image whose size has been converted by an image size conversion unit 7 is fed to the detection unit 8. The detection unit 8 performs a parallax detection processing for obtaining a parallax between two images captured by the pair of imaging units 5 and inputted via the distortion correcting units 6 and the image size conversion units 7. Further, the detection unit 8 performs a distance detection processing for detecting (measuring) a distance from the object (subject), using the parallax obtained by the parallax detection processing. Moreover, the detection unit 8 performs an object detection processing (object recognition processing) for detecting (recognizing) an object, based on the distance information measured in the distance detection processing.

Here, the processing for obtaining a parallax from a plurality of images, the process for measuring a distance using the parallax, and the processing for recognizing an object can be performed by a known method, a known circuit or the like. When a specific object such as a person appears in a image (stereo camera 10), the object detection processing may be, for example, a processing for recognizing and detecting a person, a processing in which a detected person's face is compared to a face stored in the storage unit (not shown) of the stereo imaging device 1 to detect that the person is a specific person, or a processing in which the number on a license plate of a vehicle is recognized and verified. Namely, a detection target may be appropriately selected according to an application destination of the stereo imaging device 1, and the detection unit 8 detects a distance from a predetermined detection target or recognizes an object.

The control unit 9 controls imaging processes performed by the imaging unit 5, an image reduction processing or an image cutout processing performed by the image size conversion unit 7. Specifically, when the detection unit 8 performs a detection, a detection result will be sent to the control unit 9. Then, the control unit 9 determines a processing to be performed as the reduction processing or the cutout processing in accordance with the detection result. For example, when a person is detected by the detection unit 8, the control unit 9 will decide to cut out a range including the person's image. Then, an image size conversion unit 7 cuts out a range including the person in accordance with the above decision, reduces the cutout image if necessary, and outputs a trunk image to the detection unit 8. Then, the detection unit 8 performs a detection based on the output image.

On the other hand, the control unit 9 may also be a unit for controlling the distortion correcting unit 6. Then, it is also possible to change the distortion removal method in accordance with the detection result of the detection unit 8. For example, regarding a configuration in which a distortion correcting unit 6 removes a distortion after performing the image cutout processing, it is also possible to change an arithmetic method in relation to the distortion removal based on the cutout image.

As described above, the configuration shown in FIG. 1 is merely an example, while the arrangement and configuration of various components are allowed to be different from those shown in FIG. 1.

Next, the processings performed by the stereo imaging device 1 will be described with reference to the flowchart shown in FIG. 3.

At first, the stereo imaging device 1 decides whether or not to detect a detection target (step S1). Specifically, the control unit 9 confirms whether a detection flag stored in the storage unit (not shown) is in ON state. If the detection flag is in ON state, the control unit 9 performs various controls to detect targets.

When the detection flag is in ON state and the target detection is performed (YES at step S1), the stereo imaging device 1 first performs a detection at the maximum viewing angle. Namely, at first, it is detected whether or not the detection target is included in the image of the entire area photographed by the pair of imaging units 5. At this time, the detection of a detection target at the maximum viewing angle (detection of the image in the entire photographing area) is referred to as full-screen detection.

For example, if the number of pixels in the imaging sensor is 3200×2400, the imaging unit 5 will output an image of 3200×2400. Next, the distortion correcting unit 6 removes a distortion from this image fed from the imaging unit 5. Subsequently, the image from which the distortion has been removed is reduced by image size conversion unit 7 to an image of 640×480 while maintaining the display range of the image. Then, the detection unit 8 determines whether or not the detection target is included in this reduced image. Specifically, it is determined whether or not there is a detection target in the distortion zero area of the reduced image. In the stereo imaging device 1 of the present embodiment, the detection unit 8 also determines whether or not there is a detection target outside the distortion zero area (in the viewing angle ensuring area). On the other hand, regarding a detection target outside the distortion zero area, it is also possible not to perform detection.

Next, when the detection unit 8 has determined that the detection target is present in the distortion zero area (YES at step S3), determination will be performed to determine whether or not the detection target is included in the first cutout area ("cutout 1" area) (steps S4-S6).

Here, the cutout area (respective areas of "cutout 1"-"cutout N") is an area cut out by the cutout processing, and is set according to a predetermined rule. Here, the cutout area includes at least a part of the distortion zero area in at least a part of this area. On the other hand, it is also possible for the cutout area not to include any portions outside the distortion area. Each cutout area may be set, for example, within the previous cutout area so as to be set in a narrower range than the previous cutout area (that is, the cutout area may be gradually narrowed). However, it is also possible to set the cutout area in a manner such that at least a part thereof does not overlap the previous cutout area. Further, respective cutout areas of "cutout 1"-"cutout N" may have a constant cutout position and a constant cutout size. Moreover, it is also possible for the cutout position and cutout size to change in response to an entire screen detection result or an actual detection result with respect to the previous cutout area. However, it is preferable that at least one of the cutout areas of "cutout 1"-"cutout N" includes at least a part of the detection target detected in step S3. Further, in this flowchart, it is determined whether or not there is a detection target in the region of "cutout i" ($1 \leq i \leq N$) (step S6), but it is possible to set at any time a cutout area, such that the cutout area includes a range in which the detection target has been detected in the full-screen detection or in the detection of the previous cutout region, thereby cutting out the cutout area and performing a next detection.

If the detection target is included in the "cutout 1" area (YES at step S6), the image size conversion unit 7 creates an image from which "cutout 1" area has been cut out based on the cutout processing. Then, the detection unit 8 detects the detection target based on the cutout image (step S7). However, the detection of the detection target based on the cutout image will be referred to as cutout detection.

In addition, regarding respective areas of "cutout 2" "cutout N", similar to the area of "cutout 1", the detection unit 8 determines whether or not the detection target is included in each cutout area (step S6). When the detection target is included in the "cutout i" area (YES at step S6), the image size conversion unit 7 creates an image from which the "cutout i" area has been cut out, based on the cutout processing, while the detection unit 8 performs the detection of the detection target based on the cutout image (step S7).

When the cutout detection is completed, the detection unit 8 will reflect the cutout detection result in the full-screen detection result to correct the detection result, and outputs the reflection result as a final detection result (step S9). For example, when a person is detected in the full-screen detection and the height of the person is detected to be 170 cm, but the detected person is detected to be 172 cm in the cutout detection, the detection unit 8 will output a result that a person with a height of 172 cm has been detected, as a final detection result.

The result of the cutout detection may be reflected, for example, each time the detection of each cutout region is performed. Further, the targets to be detected in the full-screen detection and the respective cutout detections may be the same or different. For example, in full-screen detection, it is detected whether or not a person is present on the screen, and in cutout detection, a part of the person (for example, face, limbs, etc.) or attributes of the person (for example, sex, age, body shape, criminal or not, etc.) may be detected. Further, for example, in the first cutout detection, it is detected whether or not a person is present in the image, and in the next cutout detection, objects held by the person (for example, a blade, a pistol, a bag, a mobile phone, etc.) are detected. In addition, it is also possible for the detection target of cutout detection to change in response to a result of the full-screen detection. Therefore, for example, during the correction of a detection result described above, in the full screen detection, it is possible to detect only the presence or absence of a person, while in the cutout detection it is possible to detect the height of the person and add the detection result to the result of the full screen detection.

Figure 3:
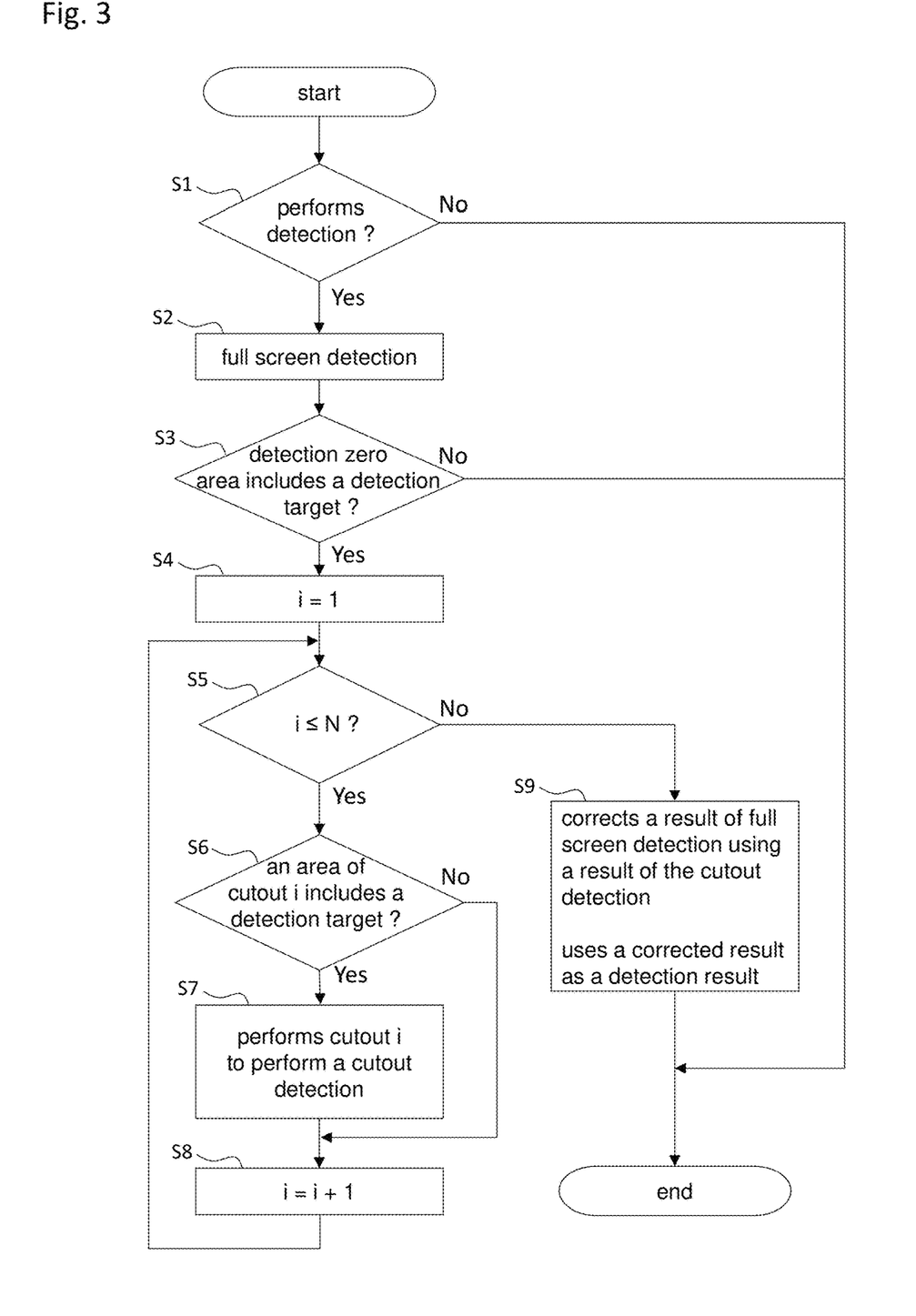
FIG. 3 is a flowchart showing various processings of the stereo imaging device.

The above flow is just an example, and it is possible for the order and configuration of respective processings to be different from those shown in FIG. 3.

Figure 4:
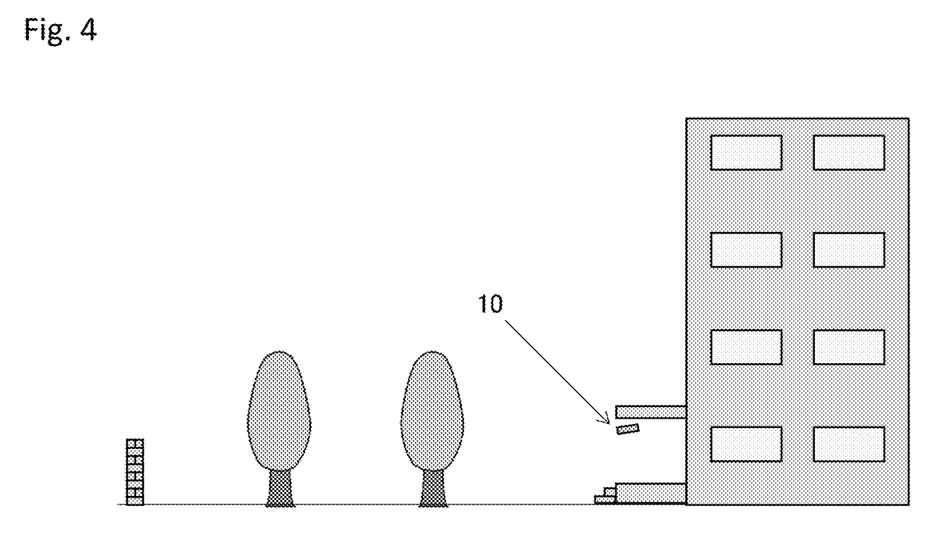
FIG. 4 is a diagram showing an example of an installation location of the stereo camera.
Figure 5:
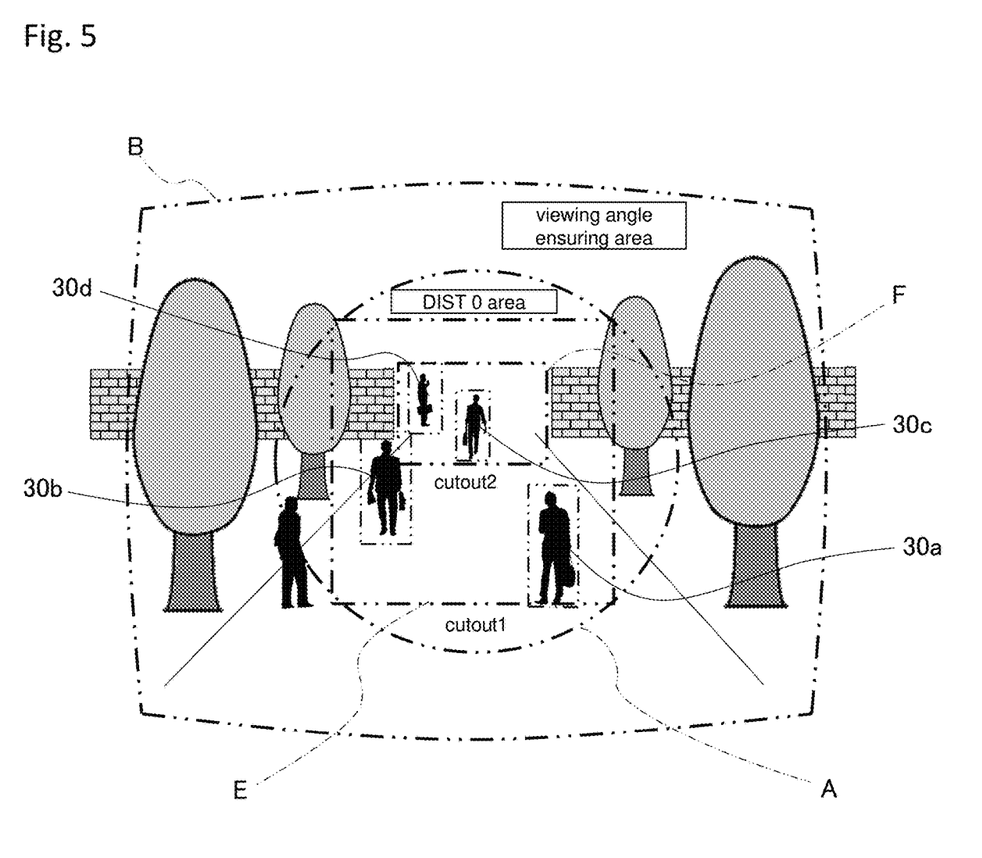
FIG. 5 is a diagram for explaining an example of a detection sequence when using the stereo imaging device.

Next, an example of the detection sequence will be described with reference to FIGS. 4, 5. As shown in FIG. 4, the stereo camera 10 is installed at the entrance of a building. Here, the detection target of the stereo imaging device 1 is a person. In the following, description will be given to a situation in which an image photographed by the stereo camera 10 is in a state shown in FIG. 5. On the other hand, although the image shown in FIG. 5 is an image outputted from one of the pair of imaging units 5, it is also possible for a similar image to be outputted from other imaging unit 5.

First, full-screen detection is performed using an image with the maximum viewing angle (image with 3200×2400 pixels) that can be photographed by the pair of imaging units 5. Then, the detection unit 8 detects a person in the distortion zero area (inside the circle A) when the person is imaged in the distortion zero area. In FIG. 5, persons 30a-30d are detected.

Next, when a person in the distortion zero area is detected, the image size conversion unit 7 cuts out, in the distortion zero area, a range of an image photographed by the stereo camera 10 and including a detected person. Then cutout detection is performed using the cutout image. Namely, cutting out a part of the image makes it possible to perform the detection of a detection target using an image having a higher pixel density. Meanwhile, at first, a range including the persons 30a and 30b who are relatively close (which is an area surrounded by a square E) is cut out as a "cutout 1" area for detection. Then, a range including the persons 30c and 30d who are relatively far away (surrounded by a square F) is cut out as a "cutout 2" area. At this time, the area of the "cutout 2" including the persons 30c, 30d who are far away, is formed such that its range is made smaller than the area of the "cutout 1" including the near-by persons 30a-30b and its pixel density is made much higher. Here, the area of "cutout 1" has the number of pixels of 1200×1200 and the area of "cutout 2" has the number of pixels of 640×480. Further, the area of "cutout 1" includes the area of "cutout 2", and the area of "cutout 1" also includes the persons 30c-30d.

In this case, the "cutout 2" area is such that the size in its horizontal and vertical directions is ⅕ of the full screen. However, since the number of pixels of the imaging sensor is (640×5)×(480×5)=7.68M or more, it is possible to perform a detection of the "cutout 2" area without performing a pixel interpolation processing (so-called zoom processing). For this reason, it is possible to perform a detection of the "cutout 2" area with a precision which is 5 times that of the full-screen detection. Namely, if the maximum cutout ratio (a ratio of an image to be minimally cut out in the cutout processing to the entire screen) in the horizontal direction is 1/P, and if the maximum cutout ratio in the vertical direction is 1/Q, further if the maximum number of pixels that can be processed by the detection unit 8 is set to be W×H, the number of pixels of the imaging sensor is preferably to be (W×P) in the horizontal direction and (H×Q) or more in the vertical direction. With such a configuration, it is possible to perform a desired detection without performing pixel interpolation processing.

When the stereo camera 10 according to the present embodiment is used as a surveillance camera in this way, as in the example shown in FIG. 5, for example, it is desirable to install the stereo camera 10 so that a place such as a gate, door or the like through which people or objects that enter the site to be monitored basically pass is included in the distortion zero area. Using this configuration, when an intruder enters a certain place, it is possible to perform a detailed analysis in advance by performing a full-screen detection and a cutout detection. Next, since a necessary step is only to trace an intruder, even if a detection precision may be low to some extent, it is still possible to perform a sufficient detection on an intruder who has moved to the viewing angle ensuring area. In some cases, regarding the intruder who has moved to the viewing angle ensuring area, it is possible to only shoot an image without performing the detection by the detection unit 8.

Figure 6:
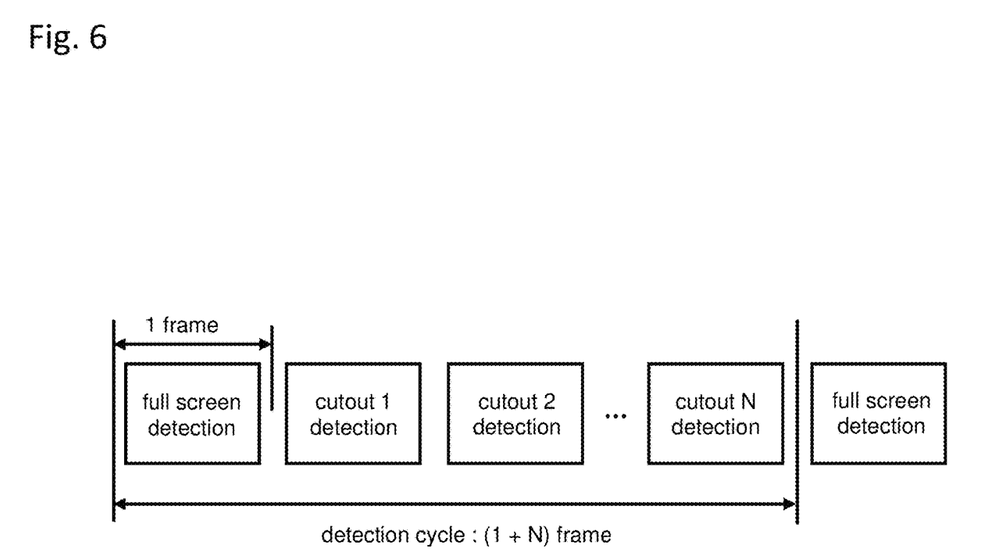
FIG. 6 is a diagram for explaining a detection frame rate when using the stereo imaging device.

Next, detection frame rate will be described with reference to FIG. 6.

If one set of detections is obtained by combining one full screen detection and N cutout detections, and if one detection result is obtained, the one set of detections will be formed from 1+N frames. Although there is no limitation on the number of times of cutout detection, it is usually necessary to perform detections at a frame rate of 10 fps or higher, thereby making it possible to detect a running person. Therefore, as in the above-described flowchart, when the result of one full-screen detection is corrected to output a final detection result by using the results of N times of cut-out detections, this set of detections is required to be performed at a frame rate of 10 fps or more. Thus, for example, if a frame rate of image picking-up of an imaging sensor is 30 fps and if a frame rate at the maximum operation of a detection circuit constituting the detection unit 8 is 30 fps, it is possible to perform a cutout detection twice with respect to one full screen detection. Further, if a frame rate of an operation of an imaging sensor and the detection circuit is 60 fps, it is possible to perform the cutout detection five times with respect to one full-screen detection.

Here, although the frame rate of the imaging sensor and the frame rate of the detection circuit are the same, it is possible to increase the frame rate of the detection circuit to (M+1) times the frame rate of the imaging sensor, and it is also possible to perform one full-screen detection and M times of cutout detection on one image photographed by the imaging sensor.

On the other hand, the number of cutout detections performed for one full-screen detection does not necessarily have to be constant. For example, it is possible to change the number of cutout detections in response to the number of detection targets included in the distortion zero area. Further, for example, when the number of detection targets included in the distortion zero area is S, it is possible to perform one cutout detection (or a number of times that is an integer multiple of S) on each of respective S detection targets.

However, a detection performed by the detection unit 8 is allowed to be a distance detection, and it is also allowable not to perform an object detection. Namely, in the above example, although the detection unit 8 detects a person, it is also possible to calculate a distance from a predetermined point to a subject present in an image of detection target, thereby outputting the distance information as the detection result of the detection unit 8. Here, a predetermined point is a point that serves as a reference point in distance detection, and is basically the position of the stereo camera 10. On the other hand, it is also possible to place the reference point at another position to calculate a distance from the reference point to a subject (respective pixels representing the subject). The result of the distance detection is outputted as a distance image. The distance image is an image where respective points on an image (for example, respective pixel areas consisting of one or more pixels) are represented by the distances from the predetermined point. For example, a distance image is represented by a change in color shade depending on a distance value. The color change may be, for example, a black-white gradation or a gradation of another color. On the other hand, regarding the detection unit 8 or other unit, when an image recognition such as an object detection is mechanically performed from a distance image, it is also possible for a distance image to represent the respective points on the image, with the respective points being represented by numerical values indicating the distances from the predetermined points.

As described above, according to the present embodiment, each image size conversion unit 7 performs the following processings. Namely, regarding the images photographed by the imaging unit 5, when a detection target is present in an area photographed through the distortion zero area of a lens 3, the image size conversion unit 7 will output a cutout image from which a range including the detection target has been cut out (such cutting-out is performed in an area photographed through the distortion zero area of an image). Then, the detection unit 8 detects a target based on the cutout image. That is, the detection unit 8 detects the target based on a image having only a small distortion. In this way, target can be detected with a high precision. Further, an image in which the detection unit 8 has been used for detection is an image cut out by an image size conversion unit 7, and therefore the display range is narrower than that of an image photographed by an imaging unit 5. In this way, an amount of image data can be reduced without lowering the resolution more than necessary. Therefore, it is possible to perform a high precision detection while maintaining a high processing speed in the detection unit 8.

As described above, according to the present embodiment, it is possible to perform a high precision detection by performing a detection using the distortion zero area, while enabling a photograph of a wide range through a viewing angle ensuring area.

On the other hand, in the present embodiment, it is also possible for an image size conversion unit 7 not to cut out an image including a detection target, with respect to the detection target in an area photographed through the viewing angle ensuring area. With such a configuration, an image including a detection target will not be cut out and a target detection based on the cutout image will not be performed, with respect to a detection target present in the viewing angle ensuring area. Therefore, it is possible to reduce the processings in the detection unit 8, thus reducing the working load on the detection unit 8. Further, by not performing the cutout detection for the detection target in the viewing angle ensuring area, it is possible to increase the number of cutout detections for the detection target in the distortion zero area, thus improving a detection precision.

On the other hand, when a detection target exists across a distortion zero area and a viewing angle ensuring area, what is necessary is only to determine whether the detection target exists in the distortion zero area or the viewing angle ensuring area, all in accordance with a predetermined rule. For example, if one of the above areas covers even a little bit of the detection target, it may be determined that the detection target is present in this area. Further, when the detection target is included in a predetermined area or more in one of the above areas, it may be determined that the detection target exists in this area.

Besides, according to the present embodiment, after a detection target is detected based on a reduced image reduced by an image size conversion unit 7, the detection unit 8 will perform a cutout detection based on the cutout image cut out by the size conversion unit 7, and correct the detection result based on on the reduced image in accordance with the cutout detection result, in a manner such that the display range will be narrower than the reduced image. Therefore, for example, by virtue of the full screen detection, after performing a rough but wide detection, it is possible to perform a high precision detection for a detection target in the distortion zero area, by performing a cutout detection. Further, since the result of full-screen detection can be corrected by using the result of cutout detection, it is possible to obtain a more accurate or precise detection result. Namely, it is possible to achieve both wide-range and high-precision detection in this way.

Further, as described above, after the detection unit 8 performs, for example, a cutout detection on the region of "cutout 1", an image size conversion unit 7 will cut out the region of "cutout 2 whose display range is at least partially different from the region of "cutout 1", and it is also possible for the detection unit 8 to perform a detection on the region of "cutout 2. According to such a configuration, since the display range of "cutout 1" region and the display range of "cutout 2" region are at least partially different from each other, the detection ranges of both detections will be partially different from each other. Therefore, it is possible to perform a highly precise detection over a wide range within the distortion zero area. Further, since it is possible to correct, based on the detection result of "cutout 2" region, a detection result of "cutout 1" region or a detection result of the full-screen detection, it becomes possible to obtain a more correct or precise detection result.

Further, as described above, after the detection unit 8 performs, for example, a cutout detection on "cutout 1" region, an image size conversion unit 7 will cut out the "cutout 2" region within the display range of "cutout 1" region, such that the display area thereof will be narrower than "cutout 1" region, while the detection unit 8 may perform a detection on the region of "cutout 2". With such a configuration, the "cutout 2" region is within the display range of "cutout 1" region and the display area thereof will be narrower than the "cutout 1" region. Therefore, for example, as in a full-screen detection, a cutout detection for the "cutout 1" region, and a cutout detection for the "cutout 2" region, it is possible to gradually increase a detection precision for a desired area, while gradually narrowing a detection range. Therefore, it becomes possible to detect in more detail various features after roughly recognizing an entire detection target.

EXPLANATIONS OF REFERENCE NUMERALS 1 stereo imaging device
3 lens
4 imaging section (imaging sensor)
5 imaging unit
6 distortion correcting unit
7 Image size conversion unit (cutout unit, reduction unit)
8 detection unit

The invention claimed is:

1. A stereo imaging device, comprising:
a pair of imaging units, each imagining unit comprises a lens and an imaging sensor, said lens having a low distortion region and a high distortion region, the low distortion region being a portion having a distortion smaller than a predetermined amount, the high distortion region being a portion having a distortion larger than the low distortion region;
a controller coupled to the pair of imaging units and configured to:
correct a distortion of an image output by the imaging units,
determine whether a detection target is present within an area photographed through the low distortion region by the pair of imaging units,
upon determining the detection target is present within the area photographed through the low distortion region by the pair of imaging units, output a cutout image of the distortion corrected image, which is obtained by cutting out a limited area that includes the detection target from the area photographed through the low distortion region by the pair of imaging units,
upon determining the detection target is not present within the area photographed through the low distortion region by the pair of imaging units, not cut out an image including the detection target, and
detect the detection target within the cutout image,
wherein an amount of distortion in the low distortion region is 5% or lower.

2. The stereo imaging device according to claim 1, wherein the controller is further configured to remove an image distortion based on a distortion of said lens before the detection target is detected within the cutout image.

3. The stereo imaging device according to claim 1, wherein the controller is further configured to:
reduce a data amount of an image photographed by said pair of imaging units, and
after performing a first detection for detecting a detection target based on a reduced image, perform a second detection for detecting the detection target based on a second cutout image, in a manner such that a display range becomes narrower than the reduced image, and correct a result of the first detection using a result of the second detection.

4. The stereo imaging device according to claim 3, wherein the controller is further configured to, after performing the second detection, perform a third detection for detecting a detection target based on a third cutout image, in a manner such that its display range is at least partially different from the display range of the second cutout image, and correct a result of previous detection using the result of the third detection.

5. The stereo imaging device according to claim 3, wherein the controller is further configured to:
after performing the second detection and within the display range of the second cutout image, perform a fourth detection for detecting a detection target based on a fourth cutout image, in a manner such that its display range becomes narrower than the second cutout image, and correct a result of previous detection using the result of the fourth detection.

6. A stereo imaging device, comprising:
a pair of an imaging units, each imaging unit comprises a lens and an imaging sensor, said lens having a low distortion region and a high distortion region, the low distortion region being a portion having a distortion smaller than a predetermined amount, the high distortion region being a portion having a distortion larger than the low distortion region;
a controller coupled to the imaging units configured to:
correct a distortion of an image output by the imaging units,
determine whether a detection target is present within an area photographed through the low distortion region by the pair of imaging units,
upon determining the detection target is present within the area photographed through the low distortion region by the pair of imaging units,
output a cutout image of the distortion corrected image, which is obtained by cutting out a limited area that includes the detection target from the area photographed through the low distortion region by the pair imaging units region, detect a detection target based on the cutout image, and
upon determining the detection target is not present within the area photographed through the low distortion region by the pair of imaging units, not cut out an image including a detection target.

7. The stereo imaging device according to claim 6,
wherein the controller is further configured to remove an image distortion based on a distortion of said lens of said pair of imaging units before the detection target is detected based on the cutout image.

8. The stereo imaging device according to claim 6,
wherein the controller is further configured to reduce a data amount of an image photographed by said pair of imaging units, and
after performing a first detection for detecting a detection target based on a reduced image, perform a second detection for detecting a detection target based on a second cutout image, in a manner such that a first display range becomes narrower than the reduced image, and correct a result of the first detection using a result of the second detection.

9. The stereo imaging device according to claim 8,
wherein the controller is further configured to, after performing the second detection, perform a third detection for detecting a detection target based on a third cutout image, in a manner such that a second display range is at least partially different from the first display range of the second cutout image, and correct a result of previous detection using the result of the third detection.

10. The stereo imaging device according to claim 8,
wherein the controller is further configured to, after performing the second detection and within the first display range of the second cutout image, perform a fourth detection for detecting a detection target based on a fourth cutout image, in a manner such that a third display range becomes narrower than the second cutout image, and correct a result of previous detection using the result of the fourth detection.

11. A method of stereo imaging with a pair of imaging units including a lens and an imaging sensor, and a controller coupled to the pair of imaging units configured to perform steps comprising:
imaging through said lenses to have a low distortion region and a high distortion region, the low distortion region having a distortion smaller than a predetermined amount, the high distortion region having a distortion larger than the low distortion region;
correcting a distortion of an image output by the imaging units;
determining whether a detection target is present within an area photographed through the low distortion region by the pair of imaging units;
upon determining the detection target is present within the area photographed through the low distortion region by the pair of imaging units, cutting and outputting a cutout image of the distortion corrected image obtained by cutting out a limited area that includes the detection target from an area photographed through the low distortion region by said imaging units;
upon determining the detection target is not present within the area photographed through the low distortion region by the pair of imaging units, not cut out an image including the detection target; and
detecting the detection target within the cutout image, wherein an amount of distortion in the low distortion region is 5% or lower.

12. The stereo imaging method according to claim 11,
wherein the controller is further configured to perform a step of removing an image distortion based on a distortion of the lens, and
wherein the distortion is removed before the detecting of the detection target based on the cutout image.

13. The stereo imaging method according to claim 11,
wherein the controller is further configured to:
perform a step of reducing a data amount of an image photographed by said pair of imaging units, and
wherein after performing a first detection for detecting a detection target based on a reduced image, perform a second detection for detecting a detection target based on a second cutout image, in a manner such that a first display range becomes narrower than the reduced image, and correct a result of the first detection using a result of the second detection.

14. The stereo imaging method according to claim 13,
wherein the controller is further configured to perform, after performing the second detection, a third detection for detecting a detection target based on a third cutout image, in a manner such that a second display range is at least partially different from the first display range of the second cutout image, and correct a result of previous detection using the result of the third detection.

15. The stereo imaging method according to claim 13,
wherein the controller is further configured to perform, after performing the second detection and within the second display range of the second cutout image, a fourth detection for detecting a detection target based on a fourth cutout image, in a manner such that its display range becomes narrower than the second cutout image, and correct a result of previous detection using the result of the fourth detection.

16. A method of stereo imaging with a pair of imaging units, each imaging unit comprises a lens and an imaging sensor and a controller coupled to the imaging unit configured to perform steps comprising:
imaging through said lenses to have a low distortion region and a high distortion region, the low distortion region having a distortion smaller than a predetermined amount, the high distortion region having a distortion larger than the low distortion region;
correcting a distortion of an image output by the imaging units;
determining whether a detection target is present within an area photographed through the low distortion region by the pair of imaging units;
upon determining the detection target is present within the area photographed through the low distortion region by the pair of imaging units, cutting and outputting a cutout image of the distortion corrected image obtained by cutting out a limited area that includes the detection target from an area photographed through the low distortion region by a pair of said imaging units when the detection target is present within the area photographed through the low distortion region;
upon determining the detection target is not present within the area photographed through the low distortion region by the pair of imaging units, not cut out an image including a detection target; and
detecting the detection target within the cutout image.

17. The stereo imaging method according to claim 16,
wherein the controller is further configured to remove an image distortion based on a distortion of the lens, and
wherein the distortion is removed before the detecting of the detection target based on the cutout image.

18. The stereo imaging method according to claim 16, wherein the controller is further configured to:
reduce a data amount of an image photographed by said pair of imaging units, and
after performing a first detection for detecting a detection target based on a reduced image, perform performing a second detection for detecting a detection target based on a second cutout image, in a manner such that a first display range becomes narrower than the reduced image, and correct a result of the first detection using a result of the second detection.

19. The stereo imaging method according to claim 18, wherein the controller is further configured to perform, after performing the second detection, a third detection for detecting a detection target based on a third cutout image, in a manner such that a second display range is at least partially different from the first display range of the second cutout image, and correct a result of previous detection using the result of the third detection.

20. The stereo imaging method according to claim 18, wherein the controller is further configured to perform, after performing the second detection and within the display range of the second cutout image, a fourth detection for detecting a detection target based on a fourth cutout image, in a manner such that a third display range becomes narrower than the second cutout image, and correct a result of previous detection using the result of the fourth detection.

21. The stereo imaging device according to claim 6, wherein an amount of distortion in the low distortion region is 5% or lower.

* * * * *